(12) United States Patent
Doerr et al.

(10) Patent No.: US 9,557,478 B2
(45) Date of Patent: Jan. 31, 2017

(54) ELECTRONIC AND OPTICAL CO-PACKAGING OF COHERENT TRANSCEIVER

(71) Applicant: ACACIA COMMUNICATIONS INC., Maynard, MA (US)

(72) Inventors: Christopher Doerr, Maynard, MA (US); Eric Swanson, Maynard, MA (US); Jon Stahl, Maynard, MA (US); Diedrik Vermeulen, Maynard, MA (US)

(73) Assignee: Acacia Communications, Inc., Maynard, MA (US)

( * ) Notice: Subject to any disclaimer, the term of this patent is extended or adjusted under 35 U.S.C. 154(b) by 0 days.

(21) Appl. No.: 14/012,876

(22) Filed: Aug. 28, 2013

(65) Prior Publication Data

US 2014/0064659 A1 Mar. 6, 2014

Related U.S. Application Data

(60) Provisional application No. 61/694,152, filed on Aug. 28, 2012.

(51) Int. Cl.
*G02B 6/12* (2006.01)
*G02B 6/43* (2006.01)
*G02B 6/42* (2006.01)

(52) U.S. Cl.
CPC .............. *G02B 6/12* (2013.01); *G02B 6/428* (2013.01); *G02B 6/43* (2013.01); *G02B 6/12004* (2013.01); *G02B 6/42* (2013.01); *G02B 6/423* (2013.01)

(58) Field of Classification Search
CPC ......... G02B 6/12; G02B 6/12004; G02B 6/43; G02B 6/122; G02B 6/428; G02B 6/02309
USPC ............................ 385/14, 15, 37; 250/214.1
See application file for complete search history.

(56) References Cited

U.S. PATENT DOCUMENTS

| 2007/0036335 | A1* | 2/2007 | Skradde et al. ............. 379/325 |
| 2010/0059822 | A1* | 3/2010 | Pinguet et al. ............. 257/351 |
| 2012/0014639 | A1* | 1/2012 | Doany ............. G02B 6/02042 385/14 |
| 2013/0308898 | A1* | 11/2013 | Doerr et al. ................. 385/14 |
| 2014/0010498 | A1* | 1/2014 | Verslegers et al. ........... 385/37 |
| 2014/0099061 | A1* | 4/2014 | Isenhour ............. G02B 6/3887 385/79 |
| 2014/0203175 | A1* | 7/2014 | Kobrinsky et al. ........ 250/214.1 |

* cited by examiner

*Primary Examiner* — Kaveh C Kianni
*Assistant Examiner* — Hung Lam
(74) *Attorney, Agent, or Firm* — Wolf, Greenfield & Sacks, P.C.

(57) ABSTRACT

Disclosed herein are co-packaging structures, devices, and methods for integrating a photonic integrated circuit (PIC), an electronic integrated circuit including drivers and transimpedance amplifiers (TIAs) and an ASIC having analog-to-digital converters and a digital signal processor positioned on a common (the same) carrier thereby resulting in a compact coherent transceiver while lowering its cost.

18 Claims, 4 Drawing Sheets

ELECTRONIC AND OPTICAL CO-PACKAGING OF COHERENT TRANSCEIVER

CROSS REFERENCE TO RELATED APPLICATIONS

This application claims the benefit of U.S. Provisional Patent Application Ser. No. 61/694,152 filed Aug. 28, 2012 which is incorporated by reference in its entirety as if set forth at length herein.

TECHNICAL FIELD

This disclosure relates generally to the field of optical communications and in particular to the co-packaging of electronic and optical elements comprising a coherent transceiver.

BACKGROUND

Contemporary optical communications systems make extensive use of coherent transceivers. Such contemporary transceivers include a laser, an optical modulator, photonic integrated circuit (PIC), modulator drivers, receiver transimpedance amplifiers (TIAs), analog-to-digital converters (ADCs), and a digital signal processor (DSP)—all separately packaged. As a result, contemporary transceivers are large and expensive.

SUMMARY

An advance in the art is made according to an aspect of the present disclosure directed to methods, structures and systems that integrate all of the above-noted transceiver components—except the laser—into a single, common carrier package.

A representative structure according to the present disclosure includes: a package body; one or more chips providing driver/transimpedance amplifier (TIA) functions positioned within the package body; one or more application specific integrated circuits (ASIC) positioned upon and in electrical communication with the driver/TIA chip(s); one or more photonic integrated circuits (PIC) positioned upon and in electrical communication with the driver/TIA chip(s); and a mast assembly affixed to the package for securing one or more optical fibers; wherein said PIC includes a etched region for optically coupling the optical fibers to a coupler integrated within the PIC.

BRIEF DESCRIPTION OF THE DRAWING

A more complete understanding of the present disclosure may be realized by reference to the accompanying drawings in which.

DETAILED DESCRIPTION

Figure 1:
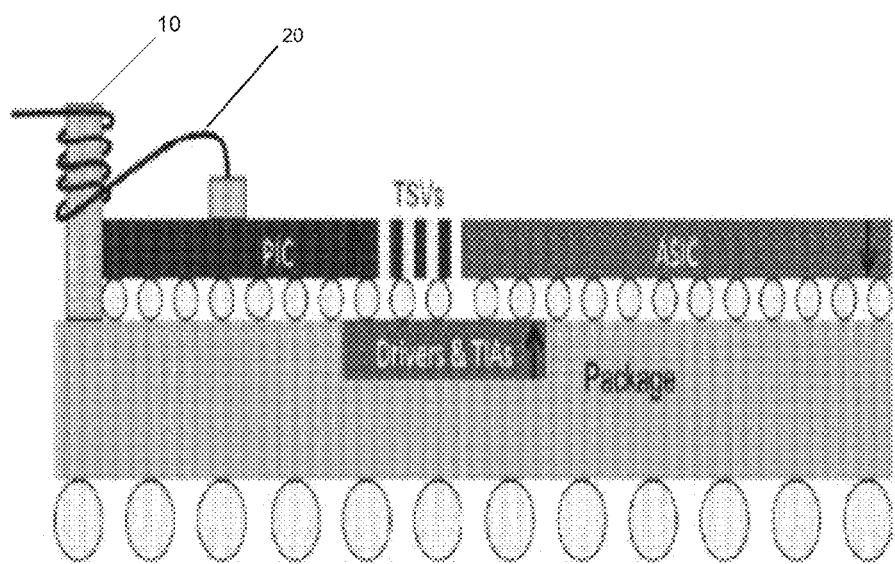
FIG. 1 shows a schematic side view of a co-packaged transceiver having a TIA/driver chip positioned under the PIC and ASIC chips according to an aspect of the present disclosure.

The following merely illustrates the principles of the disclosure. It will thus be appreciated that those skilled in the art will be able to devise various arrangements which, although not explicitly described or shown herein, embody the principles of the disclosure and are included within its spirit and scope. More particularly, while numerous specific details are set forth, it is understood that embodiments of the disclosure may be practiced without these specific details and in other instances, well-known circuits, structures and techniques have not be shown in order not to obscure the understanding of this disclosure.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

In addition, it will be appreciated by those skilled in art that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

Thus, for example, it will be appreciated by those skilled in the art that the diagrams herein represent conceptual views of illustrative structures embodying the principles of the disclosure.

By way of some additional background, it is noted that—in the prior art—coherent transceivers including a laser, an optical modulator photonic integrated circuit (PIC), an optical receiver PIC, modulator drivers, receiver transimpedance amplifiers (TIAs), analog-to-digital converters (ADCs), and a digital signal processor (DSP) are separately packaged thereby resulting in large, bulky, expensive transceivers.

In sharp contrast, coherent transceivers according to the present disclosure include the above-noted components found in prior art transceivers, however the components are co-packaged onto a common carrier. Notably, the laser is preferably packaged separately as it requires more cooling than the other components.

Turning now to FIG. 1, there is shown a schematic side view of an example transceiver according to an aspect of the present disclosure. More particularly, shown in this FIG. 1 are the components previously discussed namely a photonic integrated circuit (PIC), an application specific integrated circuit (ASIC), a driver and transimpedance amplifier (TIA) chip. The PIC and ASIC chips are positioned upon and the TIA chip is positioned within a single package substrate/component. An optical fiber "pigtail" 20 optically connects the PIC to a laser (not specifically shown) and a mandril/mast assembly 10 affixed to the package component serves as a structure around which any extra optical fiber is wrapped and/or secured. For reference purposes, arrows are shown in the FIG. 1 and point in a direction indicative of the "top" of a particular chip.

As depicted in FIG. 1, the PIC and the ASIC chips overlie and are attached to the Driver and TIAs chip and the underlying package structure through the effect of a ball grid array (BGA). The overall package may then be further interconnected to other circuits/structures through the effect of a package BGA.

As may be readily appreciated by those skilled in the art, a ball grid array (BGA) is a type of surface mount packaging used for integrated circuits. BGA packages are used to permanently mount devices such as ASICs or Microprocessors or other integrated circuits. A BGA may advantageously provide more interconnections than pins oftentimes employed in other types of packaging such as dual in-line or single in-line packages. With BGAs, an entire surface of the device may be used for interconnections, not just the perimeter or sides. BGA interconnections are also on average shorter in distance than with other types of interconnections, thereby leading to better high-speed performance.

Generally, the BGA is descended from the pin grid array (PGA), which is a package with one face covered (or partly covered) with pins in a grid pattern which, in operation, conduct electrical signals between the integrated circuit and a printed circuit board (PCB) or other structure upon which it is placed.

In a BGA the pins are replaced by pads on the bottom of the package, each initially having a tiny sphere of solder attached to it. These solder spheres can be placed manually or by automated equipment, and are oftentimes held in place with a tacky flux.

The BGA device is then placed on a PCB having solder pads in a pattern that matches the solder balls. The assembly is then heated, such that the solder balls melt. The BGA device is maintained in proper alignment with the PCB, at the correct separation distance, while the solder cools and solidifies, forming soldered connections between the BGA device and the PCB.

As may be appreciated, the BGA advantageously provides high interconnection density while maintaining relative ease and reproducible manufacture of integrated devices and structures.

Shown in FIG. 1 is the Driver/TIA chip underlying the PIC and ASIC chips and interconnected together by BGA.

Shown further are a series of through silicon vias (TSVs) in the PIC. Those skilled in the art will readily appreciate that such TSVs are a form of connection—typically vertical and electrical—that passes completely through a silicon wafer/die/chip. Generally TSVs are a known, high-performance structure used to create 3D packages and 3D integrated circuits as compared with alternatives such as package-on-package structures—as the distances of TSVs are substantially shorter and their density is typically much higher.

As may be appreciated, the PIC may employ either facet couplers or grating couplers to optically couple the PIC to the optical fiber. In one contemplated embodiment, at least three fibers will couple to the PIC namely, laser input, receive signal input, and transmit signal output and that the laser input signals may advantageously be shared between transmitter and receiver functions. Additionally, such PICs may include polarization/splitters/combiners, 90° hybrids, photodetectors, modulators, couplers as well as various taps and/or monitors as desired.

As shown in the figures—since the PICs employ grating couplers to efficiently couple optical signals to/from the PIC, the fibers are shown connected to the PIC at the top of the PIC. Advantageously, tight bend radius fibers (<2 mm) may be employed and routed through grooves or other paths through the assembly. The fibers may be then secured to the PIC using adhesives or other affixing mechanisms known which will tolerate the ~200 degree C. temperatures that may be experienced during the soldering of the BGA to a circuit or other board.

As may be further appreciated and as shown in FIG. 1, the optical fibers 20 may be wound around a small mandril/mast 10—~6 mm in diameter—and attached to the overall package such that any "dangling" optical fiber is eliminated.

Figure 2:
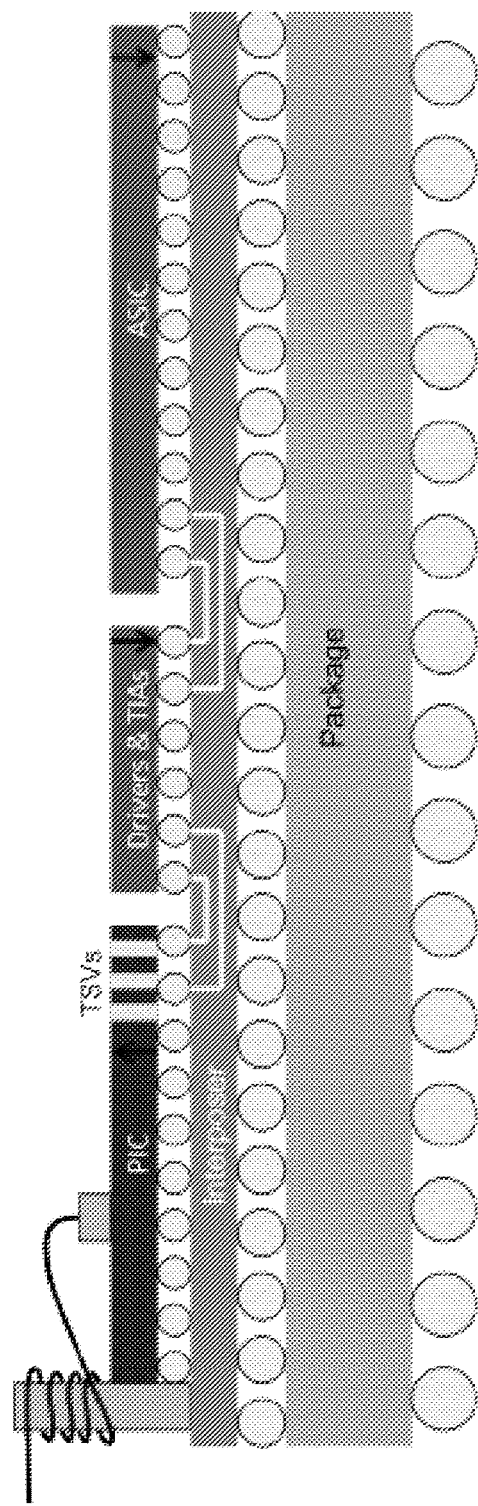
FIG. 2 shows a schematic of side view of a co-packaged transceiver including a silicon interposer according to an aspect of the present disclosure.

Turning now to FIG. 2 there is shown a schematic side view of an example transceiver according to another aspect of the present disclosure. More particularly, show in this FIG. 2 are the components previously discussed namely a photonic integrated circuit (PIC), an application specific integrated circuit (ASIC), a driver and transimpedance amplifier (TIA) chip. In this exemplary embodiment, the PIC, ASIC and TIA chips are positioned upon and interconnected with an interposer structure through the effect of BGAs.

As those skilled in the art will readily appreciate an interposer such as that shown in an electrical structure (interface) that routes between connections. The purpose of such an interposer structure is to spread or reroute a connection to a different connection. With respect to the structures shown in FIG. 2, the interposer interconnects the PIC chip with the TIA chip and the ASIC chip to the TIA chip. The interposer having the PIC and TIA and ASIC chips attached is then further attached to the overall package substrate/structure with a BGA. Through this use of the interposer, variations in configuration are possible and in particular the orientation of the individual chips relative to one another.

At this point it may be apparent to those skilled in the art that the structure depicted in FIG. 1 is more compact than that depicted in FIG. 2. However such compactness is achieved through the effect of a depression or cutout in the package into which the TIA chip is positioned. With the use of the interposer, a somewhat larger and more conventional overall packaging is achieved however, the use of the interposer may affect high speed signal however the overall assembly may prove to be more convenient and manufacturable than alternatives.

Figure 3:
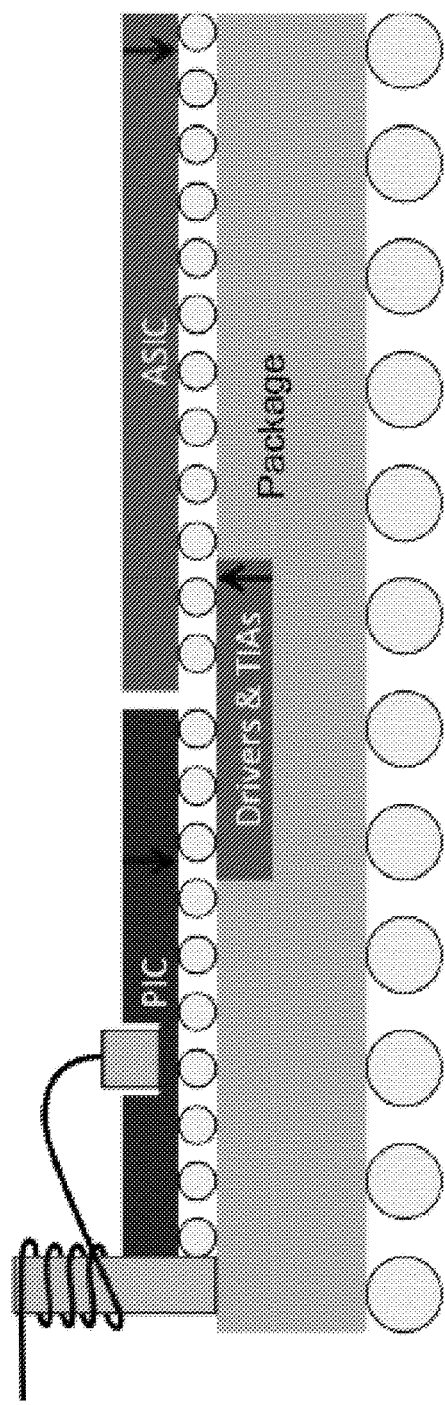
FIG. 3 shows a schematic side view of a co-packaged transceiver including a PIC positioned upside down and holes are etched in its backside such that on-chip grating couplers are accessed according to an aspect of the present disclosure.
Figure 4:
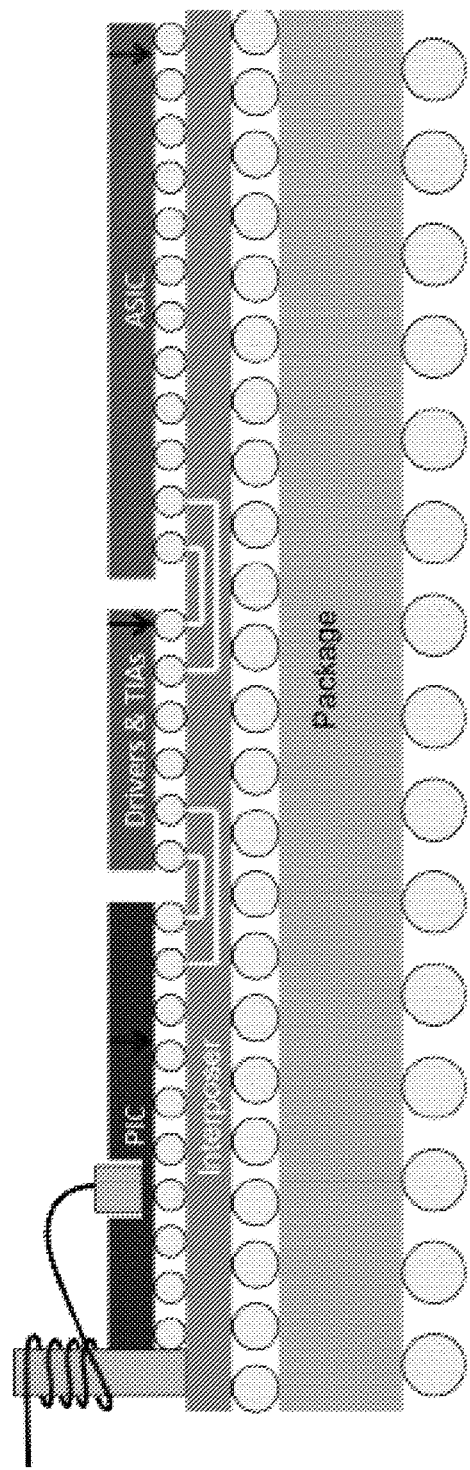
FIG. 4 shows a schematic side view of a co-packaged transceiver including a PIC positioned upside down and holes are etched in its backside such that on-chip grating couplers are accessed according to an aspect of the present disclosure.

With reference now to FIG. 3 there is shown a side view of a co-packaged transceiver wherein the TIA chip is positioned under the PIC and ASIC chips in a recess formed in the overall package/substrate. Shown further in this figure is that the PIC chip is positioned "upside down" (top facing BGA), and an etching is made in the bottom surface of that PIC such that the optical fiber assembly may connect to a grating coupler on the PIC as shown. A similar etching made in the back of the PIC is shown in the alternative embodiment depicted in FIG. 4 which employs an interposer in a manner analogous to that depicted and described previously.

With respect to the etching made in the bottom (backside) of the PIC, it is noted that a single hole etch may be made or multiple void etches (one for each fiber) may be employed as desired and convenient. Such a single hole would be large enough to accommodate a single fiber assembly, while the multiple holes would individually be sufficiently large to accommodate a single fiber. Advantageously, a mirror or other reflective structure may be deposited on top of the grating coupler such that its coupling efficiency is enhanced.

Notably, while we have shown the TIA and driver chip to be a single structure, those skilled in the art will recognize that they could be multiple chip structures, or particular components (e.g., TIAs) could be integrated with other chips such as the PIC or ASIC.

Those skilled in the art will readily appreciate that while the methods, techniques and structures according to the present disclosure have been described with respect to particular implementations and/or embodiments, those skilled in the art will recognize that the disclosure is not so limited. Accordingly, the scope of the disclosure should only be limited by the claims appended hereto.

The invention claimed is:

1. A co-packaged electronic and optical apparatus comprising:
   a package substrate body;
   a chip comprising a driver and/or transimpedance amplifier (TIA), the chip being attached to the package substrate body;
   an application specific integrated circuit (ASIC) attached to and in electrical communication with the chip;
   a photonic integrated circuit (PIC) adjacent to and in electrical communication with the chip, the PIC having a surface;
   a single-piece mast positioned adjacent to the PIC; and
   an optical fiber coiled around the single-piece mast and having an end terminating substantially perpendicularly on the surface of the PIC.

2. The co-packaged electronic and optical apparatus of claim 1, wherein the PIC and the ASIC are mechanically and electrically connected to the chip and a top surface of the package substrate body through the effect of ball grid array (BGA) structures.

3. The co-packaged electronic and optical apparatus of claim 2, wherein a bottom surface of the package substrate body includes BGA structures.

4. The co-packaged electronic and optical apparatus of claim 2, wherein the PIC includes a number of through silicon vias (TSVs) formed therein.

5. An apparatus comprising the co-packaged electronic and optical apparatus of claim 2 in combination with a laser source, wherein the PIC is optically connected to the laser source via the optical fiber.

6. A co-packaged apparatus comprising:
   a package substrate body;
   an interposer adjacent to and in electrical communication with the package substrate body through the effect of a ball grid array (BGA);
   a chip comprising a driver and/or transimpedance amplifier (TIA), the chip being adjacent to and in electrical communication with the interposer through the effect of a BGA;
   an application specific integrated circuit chip (ASIC) adjacent to and in electrical communication with the interposer through the effect of a BGA;
   a photonic integrated circuit (PIC) adjacent to and in electrical communication with the interposer through the effect of a BGA, wherein said interposer electrically interconnects the PIC to the chip and electrically interconnects the ASIC to the chip;
   a mast positioned adjacent to the PIC; and
   an optical fiber secured to the mast so that an end of the optical fiber is approximately normal to a surface of the PIC.

7. The co-packaged apparatus of claim 6 wherein a bottom surface of the package substrate body includes BGA structures.

8. The co-packaged apparatus of claim 7, wherein the PIC includes a number of through silicon vias (TSVs) formed therein.

9. An apparatus comprising the co-packaged apparatus of claim 6 optically connected to a laser source via the optical fiber.

10. The apparatus of claim 5, wherein the apparatus comprises an optical coherent transceiver of which the laser source and the co-packaged electronic and optical apparatus form a part.

11. The co-packaged electronic and optical apparatus of claim 1, wherein the surface is a surface of a recess in the PIC, and wherein an optical fiber assembly is mounted in the recess.

12. The co-packaged electronic and optical apparatus of claim 11, wherein the PIC is flip-chip mounted on the package substrate body.

13. The co-packaged electronic and optical apparatus of claim 12, wherein the PIC further includes a mirror.

14. The co-packaged electronic and optical apparatus of claim 1, wherein the chip is mounted in a recess of the package substrate body.

15. The co-packaged electronic and optical apparatus of claim 1, wherein the surface is a backside surface of the PIC.

16. The apparatus of claim 9, wherein the apparatus comprises an optical coherent transceiver of which the laser source and the co-packaged apparatus form a part.

17. The co-packaged apparatus of claim 6, wherein the PIC includes an etched recess in which an optical fiber assembly is mounted to optically couple the optical fiber to the PIC.

18. The co-packaged apparatus of claim 6, wherein the mast is mounted on the interposer.

* * * * *